United States Patent
McSherry

[15] 3,651,734
[45] Mar. 28, 1972

[54] EXPANSIBLE FASTENER
[72] Inventor: Thomas W. McSherry, Medford, N.Y.
[73] Assignee: Mechanical Plastics Corp., New York, N.Y.
[22] Filed: July 10, 1969
[21] Appl. No.: 845,655

Related U.S. Application Data
[63] Continuation-in-part of Ser. No. 844,690, Apr. 23, 1969, abandoned.

[52] U.S. Cl............................................85/80, 85/82, 85/9, 85/37, 151/41.75
[51] Int. Cl........................................................F16b 13/04
[58] Field of Search..............................85/80, 82, 84, 37, 5; 151/41.75; 24/73.8 P, 73.8 D, 73 PF, 73 A, 73 SM, 208.3, 213, 214

[56] References Cited

UNITED STATES PATENTS

| | | | |
|---|---|---|---|
| 3,350,976 | 11/1967 | Topf | 85/83 |
| 3,481,242 | 12/1969 | Topf | 85/37 |
| 2,863,185 | 12/1958 | Riedi | 287/20.92 E |
| 2,948,937 | 8/1960 | Rapata | 85/82 |
| 3,162,086 | 12/1964 | Wells et al. | 85/82 |
| 3,213,745 | 10/1965 | Dwyer | 85/80 |
| 3,213,746 | 10/1965 | Dwyer | 85/80 |
| 3,438,302 | 4/1969 | Sandor | 85/84 |

Primary Examiner—Marion Parsons, Jr.
Attorney—Brumbaugh, Graves, Donahue & Raymond

[57] ABSTRACT

A fastener having a head engageable with one end of an opening, an expandable overcenter toggle lock on the other side of said opening expandable from a collapsed position in which the fastener is insertable within an opening to an overcenter stable expanded condition to lock the fastener within the opening, and a pair of spaced apart resilient members connecting the head and the expandable toggle lock to transmit forces to the toggle lock to maintain it in the stable overcenter position.

28 Claims, 28 Drawing Figures

INVENTOR
THOMAS W. McSHERRY

INVENTOR
THOMAS W. McSHERRY
BY
his ATTORNEYS

INVENTOR
THOMAS W. McSHERRY
BY
his ATTORNEYS

INVENTOR
THOMAS W. McSHERRY
BY
Brumbaugh, Graves, Donohue & Raymond
his ATTORNEYS

EXPANSIBLE FASTENER

This is a continuation-in-part of application Ser. No. 844,690 filed Apr. 23, 1969 now abandoned.

BACKGROUND OF THE INVENTION

This invention relates generally to fasteners and more particularly to a fastener having an expandable toggle lock for securely maintaining it in place within an opening.

Fastening devices embodying expandable means for locking or anchoring devices in a hole have been heretofore proposed. Some fasteners of this type have been complex, costly and lacking in versatility. Others, although not of complicated structure, have required the presence of a stud or the shank of a screw to maintain the device in its expanded position. Withdrawal of the stud or shank has characteristically resulted in the collapse of the expandable means and the easy removal of the device from the opening.

The present invention overcomes the disadvantages or prior art fastening devices by providing a novel fastener that is of very simple construction which can be formed in one piece from resilient material and which has a surprisingly effective and reliable locking action.

SUMMARY OF THE INVENTION

In view of the foregoing, it is a general object of this invention to provide an inexpensive, reliable fastener, producible in a wide variety of configurations for employment alone or in combination with other fastening provisions.

Another object of this invention is the provision of a fastener which is remarkably easy to apply, yet highly resistant to unintentional removal.

A further object of this invention is to provide a fastener which increases its resistance to removal with increased forces applied thereto.

Yet another object of this invention is the provision of a fastener particularly suitable for formation as an integral part of the accessory or object which it is to support.

A further object of the invention is the provision of a fastener having a locking structure movable in overcenter fashion to an expanded, locking condition.

It is another object of this invention to provide a fastener in which an expansible locking structure is capable of snap-action expansion to lock the fastener in place.

Still another object of this invention is to provide a fastener of which the inventive features are capable of use in a wide variety of forms specifically suited to any of a number of diverse applications.

These foregoing and other objects are achieved in a fastener having a head, an expansible and contractable locking structure, and resistant force transmitting connectors interconnecting the head and expansible portion. Contracted, the locking structure is of significantly decreased lateral extent, allowing insertion through an opening. Expanded, the locking structure extends laterally beyond the periphery of the opening, drawing the connectors outwardly into engagement with edges of the opening to place the connectors in tension between the locking structure and the opening edges.

The locking structure may include substantially rigid portions or toggle arms, collapsible to a generally longitudinally extending or side-by-side position, and expansible about a central portion or pivotal connection. To expand the locking structure, the central portion or pivotal connection is moved from or through an area between the connectors, pivoting the arms or rigid portions outwardly to a laterally extending oncenter position in which the forces applied by the connectors are aligned with the central portion. The central portion then moves through the aligned position and snaps to a further position of misalignment with the applied forces, the rigid portions or arms then being in an overcenter disposition in which the forces applied laterally or radially inwardly by the connectors oppose return movement of the locking structure to the oncenter position. Preferably, the locking structure is prevented from moving further overcenter, either by the inability of the rigid portions or arms to pivot further in that direction, or by contacting of fastener portions with a surface adjacent the opening.

The arms may be centrally pivotally connected together by various types of pivotal connections to form the movable central portion. Alternatively, the central arms may lack direct physical interconnection but may be pivotable about their centrally located ends when a further member is inserted into contact with those ends.

The locking structure may be formed to assume naturally an expanded condition without the application of external forces as, for example, by molding the parts of the locking structure of suitable synthetic material and in an expanded condition. Thus, the fastener may be inserted well into an opening, allowing the locking structure to expand naturally, and the fastener may then be drawn outwardly until the connectors contact edges of the opening, applying the laterally inwardly directed forces to the expanded locking structure to resist collapse thereof.

Further specific objects of the invention are realized in the various embodiments described below with respect to the associated drawings. For example, fasteners of the type discussed are provided specifically for employment with relatively thin or sheetlike members, whereas other fastener embodiments are shown which are especially suitable to be produced by extrusion.

With the foregoing objects in view, together with those objects appearing hereafter, the invention will be more clearly understood with reference to the detailed description of the preferred embodiments illustrated in the associated drawings.

DESCRIPTION OF PREFERRED EMBODIMENTS

Figure 1:
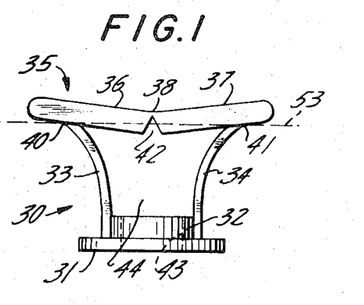
FIG. 1 is an elevational view of the fastener in accordance with the invention, showing an expansible and contractable locking structure, and flexible connectors extending between the locking structure and a fastener head.

In FIGS. 1 through 5 there is illustrated a novel fastener 30 in which all parts are integrally molded or formed in the natural unbiased configuration illustrated in FIG. 1. Suitable materials for the construction of this and other fastener embodiments to be described blow include polypropylene, polyethylene, and nylon, as well as a wide variety of materials which may be chosen with consideration to the fastener configuration, the manner of formation, and the intended use.

The fastener 30 includes an enlarged head 31 having a reinforcing boss 32 formed thereon. A pair of resilient flexible connectors 33 and 34 are joined with the boss 32 and head 31, the boss assuring firm connection of the head and connectors. The connectors 33 and 34 interconnect the head 31 and an expansible and contractable locking structure 35 which includes two substantially rigid toggle members or arms 36 and 37 joined centrally at a pivotal connection 38. The connectors 33 and 34 are integrally joined at an angle to the arms 36 and 37, respectively, at connection points 40 and 41, the connectors diverging as they approach the arms. Here, as in the further modifications discussed below, the arms and connectors are initially integrally formed in their correct angular relationship without subsequent forming.

A reduction of the thickness of the integrally formed arms 36, 37 where they meet centrally forms the central pivotal connection 38. Thus, a recess 42 is provided in alignment with an opening 43 formed through the head 31 and boss 32. The connectors 33, 34 are spaced apart laterally to define a central open area 44 into which the pivotal connection 38 and centrally located end portions of the arms 36, 37 move upon collapse of the locking structure 35, as shown in FIG. 2.

the locking structure 35 is collapsed by forcing the outermost end portions of the arms 36, 37 upwardly and laterally inwardly toward one another, the pivotally connected arms moving to substantially side-by-side or longitudinally extending positions of significantly decreased lateral extent. Collapsed transversely in this fashion, the locking structure 35 may then be inserted through an opening 45, smaller in diameter than either the head 31 or the expanded locking structure.

Figure 2:
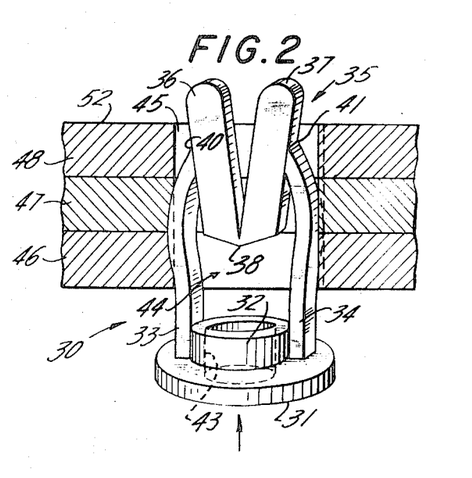
FIG. 2 is a fragmentary view, partially in section, showing the fastener of FIG. 1 with the locking structure collapsed for insertion through an opening.
Figure 3:
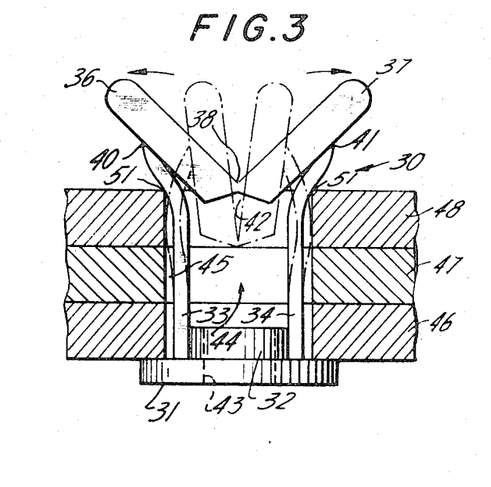
FIG. 3 is a fragmentary view, partially in section, illustrating the fastener of FIG. 1 with arms of the locking structure laterally extended.
Figure 4:
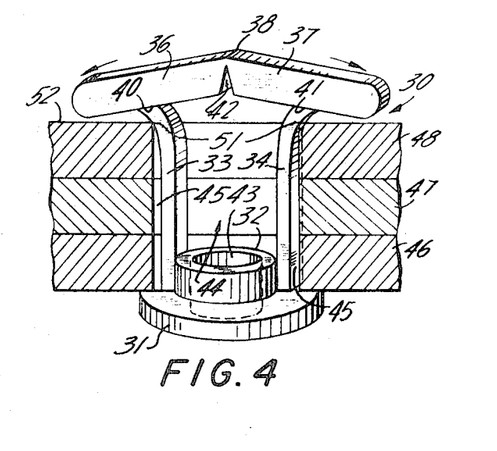
FIG. 4 is a further fragmentary view, like those of FIGS. 2 through 3, in which a central pivotal connection of the arms has been moved upwardly to expand the locking structure to an overcenter position.
Figure 5:
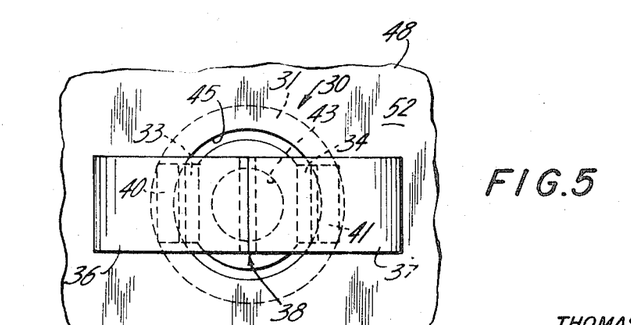
FIG. 5 is a fragmentary pan view of the fastener of FIGS. 1 through 4, showing the expanded arms extending across the associated opening.

FIGS. 2 through 4 illustrate the fastener fastening together several parts, the opening 45 being formed by three aligned openings in three platelike members 46 through 48. The fastener 30 is locked in place by pivoting the arms 36, 37 outwardly. This is preferably done by the insertion of a probe through the opening 43 of head 31 and boss 32 to cause the pivotal connection 38 to move away from the head 31 and out of the central area 44 defined between the connectors 33, 34. Expansion of the locking structure 35 in this fashion, allows the fastener 30 to be employed where only one side of the apertured member or members is accessible.

Spreading of the arms, as indicated in FIG. 3, spreads also the points 40 and 41 at which the connectors join the arms, and the connectors 33, 34 are drawn into engagement with the edges of the opening 45 at points 51. As the arms 36, 37 expand, the connectors 33, 34 are increasingly placed in tension between the points 51 and the points of connection 40, 41.

The compressive forces, or bias, applied to the arms by the resilient connectors, initially resist movement of the central arm connection 38 into alignment with the points 40 and 41. As the pivotal connection 38 continues upward movement, however, the locking arrangement 35 moves across-center and the arms 36, 37 snap into their expanded positions as shown in FIG. 4.

The tendency of the arms 36, 37 to be forced further overcenter by the stressed connectors 33, 34 is resisted by the interpositioning of the upper connector ends between the arms and surface 52 of the member 48. The outer ends of the arms 36, 37 may come to rest without contacting the surface 52, as in FIG. 4, and since the arms need not actually engage the surface 52, the depth of the opening 45 relative to the length of the connectors 33, 34 is not critical, provided the connectors 33, 34 are constrained inwardly by the opening 45 at the points 51.

Formation of the pivotal connections 38 as in FIGS. 1 through 5 provides additional assurance against extreme overcenter movement of the arms 36 and 37. The portion of the pivotal connection 38 near the recess 42 is increasingly compressed and the further side is placed increasingly in tension during upward movement of the pivotal connection 38 to resist further movement of the arms. Eventually, the opposed faces of the recess 42 would meet to stop further overcenter movement, should the arms not come to rest before that occurs.

The extension of the connectors 33, 34 about the edge points 51 causes forces tending to withdraw the fastener only to increase the forces applied to the arms 36 and 37, thereby increasing resistance to collapse of the locking structure 35. In this connection, the head 31 and the boss 32 are perfectly suitable for employment with a self-threading screw to support some further member upon the fastener 30.

Returning to FIG. 1, it should be noted that the locking structure 35 is in an expanded overcenter condition when the fastener 30 assumes the natural unbiased configuration in which it is formed. A line 53 extending between the connection points 40 and 41 demonstrates the misalignment of the central pivotal connection 38 and connection points 40, 41. The pivotal connection 38 is naturally disposed on the opposite side of the line 53 from the central area 44 into which the pivotal connection 38 must move for collapse of the locking structure.

Thus, if the fastener 30 is inserted through an opening wider or more shallow than the opening 45, such that the locking structure 35 returns naturally to its expanded disposition, the locking structure 35 will, nevertheless, resist removal of the fastener from within such an opening. That is, as one attempts to withdraw the fastener 30 by forcing the head 31 away from the apertured member, the diversion of the connectors 33 and 34 as they approach the arms causes the connectors more firmly to engage the opening edges, applying compressive or inwardly directed forces to the arms 36, 37 at the connection points 40, 41. Because the locking structure has assumed its natural disposition as illustrated in FIG. 1, these inwardly directed forces only cause the central pivotal connection 38 to move upwardly, forcing the locking structure further overcenter.

Figure 6:
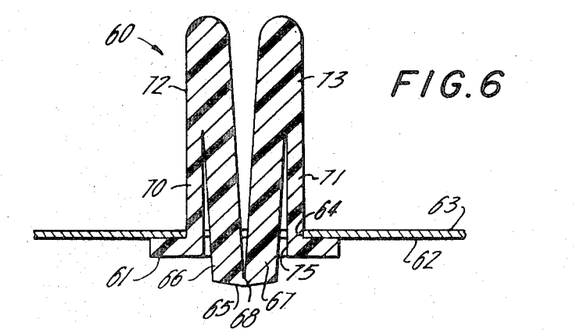
FIG. 6 is a fragmentary sectional view, showing the fastener embodiment adapted for use with thin apertured members.
Figure 7:
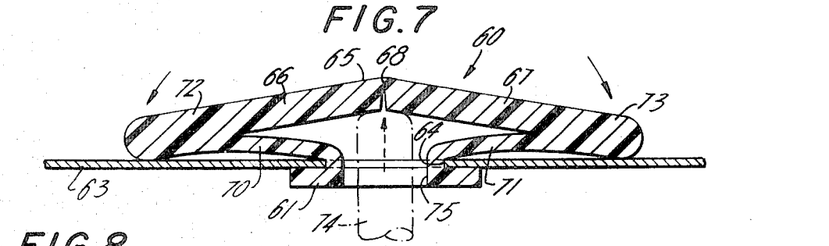
FIG. 7 is a further fragmentary sectional view of the fastener of FIG. 6, illustrating the expansion of pivotally connected arms by the insertion of a probe or tool through the fastener head.

In FIGS. 6 and 7, a modified fastener 60 is illustrated which is particularly suitable for employment with sheet material or relatively thin apertured members. The fastener 60 may initially be formed in the configuration shown in FIG. 6 for immediate insertion into an opening without initial deformation. An enlarged head 61 is provided for engagement with a surface 62 of a relatively thin, sheetlike member 63 through which is formed an opening 64.

A collapsible and expansible locking structure 65 again includes a pair of toggle members or arms 66 and 67, centrally connected at a pivotal connection 68. Resilient flexible connectors 70 and 71 extend from the head 61 and merge with the arms 66 and 67, respectively, to form combined arm and connector terminal portions 72 and 73. To expand the locking structure 65, a tool 74 may be applied to the pivotal connection 68 of the arms 66, 67 and forced upwardly through an opening 75 in the head 61 to move the locking arrangement 65 through its oncenter position. The connectors 70, 71 and the terminal portions 72, 73 move outwardly, and the connectors are placed in tension between the edges of the opening 64 and the ends of the arms 66, 67 to effect snap-action movement of the arms 66, 67 into the overcenter positions shown in FIG. 7.

Once expanded, the arms 66, 67 have laterally inwardly directed or compressive forces applied thereto, opposing movement of the pivotal connection 68 toward the oncenter position of alignment between the combined terminal portions 72, 73. Further overcenter movement of the locking structure 65 is prevented by abutment of the combined portions 72, 73 with the surface of the sheetlike member 63. Again, forces applied to the head 61 tending to withdraw the fastener from the opening 64 only serve to increase the compressive forces applied to the arms 66 and 67 to resist collapse of the locking structure 65.

As in the embodiment of FIGS. 1 through 5, the fastener 60 may initially be formed with the locking arrangement 65 in an expanded condition rather than in the collapsed condition shown in FIG. 6. For example, the fastener 60 may initially be molded into the configuration shown in FIG. 7; in which case the arms 66, 67 would need physically to be held in their longitudinally extending positions for insertion through the opening 64. As the arms 66, 67 and the connectors 70, 71 were moved through the opening 64, then, the locking structure 65 would expand.

As in each of the fastener modifications described herein, the connectors 70 and 71 are constrained inwardly at edge points of the opening through which the fastener extends. Points of constraint 76 are thus defined beyond which the connectors 70 and 71 are outwardly forced by spreading of the toggle members 66, 67.

Here, as in each of the arrangements, good overcenter locking is assured by attention to the relative length of the connectors 70 and 71 with respect to the arms 66 and 67. The length A of each connector 70 and 71 should be greater than the length B of each of the associated arms 66 and 67, where the connector length A is measured from the associated point of constraint 76 to point at which the connector joins its associated arm, and the length B of each associated arm is measured from its centrally located end to the point at which the connector joins the arm. Of course, the combined length 2B of the arms exceeds the width of the opening. Thus, a remarkably good locking action is assured by selecting connector and arm lengths which, when employed with an opening of proper width and depth, result in firm engagement of the connectors at the opening edges and stable overcenter positioning of the arms to hold the connector in said firm engagement.

Since the arrangements illustrated in FIGS. 6 and 7 are provided particularly for use with a relatively thin or sheetlike apertured member 63, the full length of the flexible connectors 70, 71, is reduced quite substantially with respect to the lengths of the arms 66, 67. That is, since the apertured member 63 is thin, the points of constraint 76 are quite near the fastener head 61; the lengths of the connectors 70 and 71 from the head to the arms are reduced accordingly. With this in mind, the opening 75, provided centrally through the head 61, is made wide enough to allow the arm ends 66, 67 to extend therethrough. This allows the arms to be sufficiently long to assure good overcenter locking and firm engagement of the connectors at the opening edge points 76.

Figure 8:
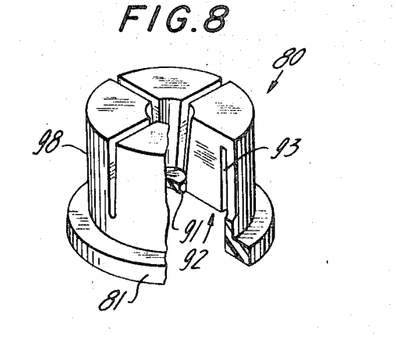
FIG. 8 is a perspective view of a further modification of the fastener with parts broken away for clarity, the fastener including four spreadable and centrally connected arms.
Figure 9:
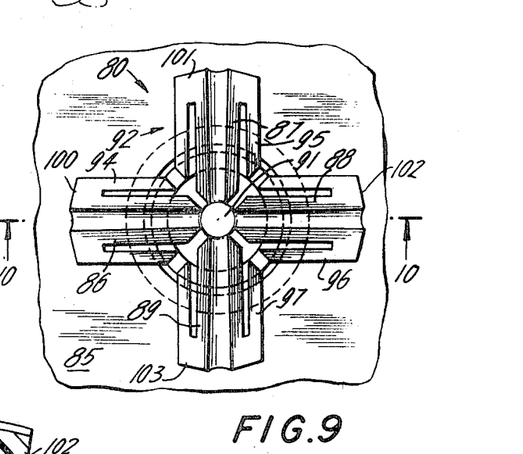
FIG. 9 is a fragmentary plan view of the fastener of FIG. 8 in association with an apertured member, the arms being spread to expanded positions.
Figure 10:
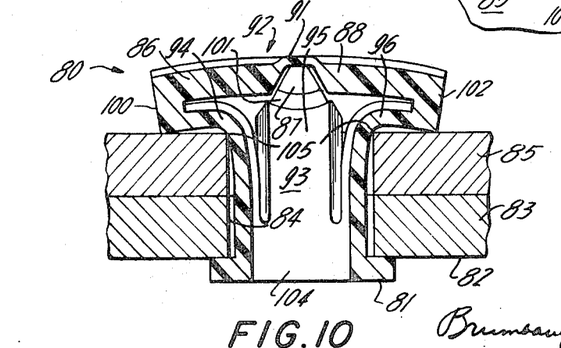
FIG. 10 is a fragmentary cross-sectional view, taken along the line 10—10 of FIG. 9, showing the relationship of the arms and connectors, the fastener connecting two apertured members.

A further arrangement of the fastener, illustrated in FIGS. 8 through 10, includes an enlarged head 81, engageable with a surface 82 of an apertured member 83 opposite a modified locking arrangement. An opening 84, into which the fastener 80 extends, includes aligned openings of the apertured member 83, and a further apertured member 85. Like the foregoing fasteners, the fastener 80 may be employed exclusive of any further fastening provisions, as shown in FIGS. 8 through 10, to hold securely together those members through which it extends, or the fastener 80 may be employed to provide anchorage for a stud or self-threading screw used to affix further provisions to the member or members through which it extends.

Four arms 86 through 89, are joined centrally at a longitudinally movable pivotal connection 91 to form an expansible and contractable locking structure 92. With the fastener 80 in its relaxed condition, the arms 86 through 89 are housed within a central area 93, defined between four resilient connectors 94 through 97. The four connectors 94 through 97 connect the head 81 with the four arms 86 through 89, respectively, and the connectors define, with the locking structure 92 in its contracted, relaxed condition, a segmented cylindrical surface 98, suitable for insertion into the opening 84.

The arms 86 through 89 and the connectors 94 through 97 terminate in combined terminal portions 100 through 103, respectively. Again, an opening 104, defined through the head 81, allows the passage of a tool into engagement with the pivotal connection 91 to force the pivotal connection longitudinally away from the head 81. When the arms are expanded, the connectors 94 through 97 engage edges of the opening 84 at points 105 spaced about the periphery of the opening 84. The connectors 94 through 97, are placed in tension between the contact points 105 and the combined arm and connector terminal portions 100 through 103, applying laterally inwardly directed forces to the arms.

Upward movement of the pivotal connection 91 results in overcenter movement of the locking structure 92 to provide snap-action of the locking structure into the expanded condition of FIGS. 9 and 10. Again, in this condition, forces applied to the fasteners 80, tending to withdraw the fastener from the opening 84, only increase the forces applied by the flexible connectors to the arms and increase resistance of the locking structure 92 to collapse and withdrawal.

The employment of four arms and four associated flexible connectors provides greater contact of the fastener 80 with the apertured member 85 by increasing the number of points 105 at which the connectors 94 through 97 contact and restrain the member 85. Additionally, the combined terminal portions 100 through 103 provide further contacting of the fastener 80 with the apertured member 85 and, the greater the forces applied to the head and nearby connector portions, the greater the tendency of locking structure 92 to move further overcenter, increasing the forces of the terminal portions 100 through 103 against the surface they contact. Thus, a fastener or great strength is provided which greatly resists removal or movement of parts held together by the fastener.

Figures 11, 12, 13, 14:
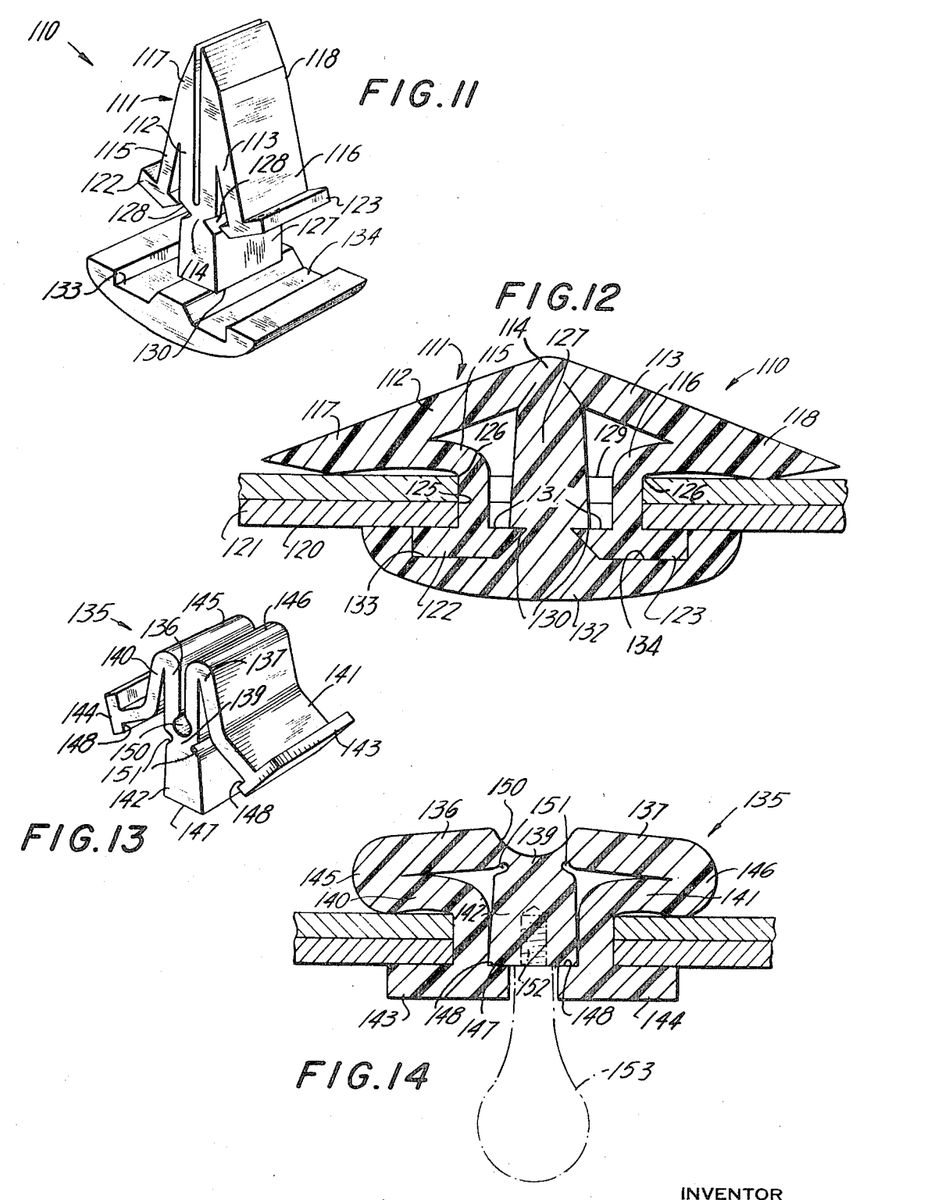
FIG. 11 is a perspective view of the fastener further modified to include an operating member, a head enclosing portion, and locking shoulders, all integrally formed.
FIG. 12 is an enlarged fragmentary sectional view, showing the fastener of FIG. 11 locking together two apertured members.
FIG. 13 is a perspective view of a further arrangement of the fastener including an integral central operating and locking member connected with a movable central connection of the expansible arms.
FIG. 14 is an enlarged fragmentary sectional view, showing the fastener of FIG. 13, the operating portion being locked centrally between the connectors.

In FIGS. 11 and 12, a further modification of the fastener is shown. A fastener 110 includes an expansible and collapsible locking structure 111, including two arms 112 and 113 centrally joined at a pivotal connection 114. Each of a pair of flexible connectors 115 and 116 is joined with one of the arms 112 and 113 at combined terminal portions 117 and 118, respectively. In the fastener 110, however, the fastener head engageable with a surface 120 of an apertured member 121 is provided by first and second enlarged connector end portions 122 and 123 formed integrally with the flexible connectors 115, 116.

With the locking structure 111 collapsed as in FIG. 11, the arms 112, 113 and the flexible connectors 115, 116 are inserted into an opening 125 extending through the member or members with which the fastener is employed. Once the connector end portions 122 and 123 engage the surface 120, the pivotal arm connection 114 is forced away from the enlarged connector end portions, the arms 112, 113 are pivoted outwardly, and the flexible connectors 115, 116 are bent about edge points 126 of the opening 125. Again, stretching of the connectors 115, 116 places the connectors in tension, and applies laterally inwardly directed forces to the arms 112, 113. The pivotal connection 114 moves out of alignment with the applied forces, causing the locking structure 111 to move into its stable, expanded condition.

The modified fastener of FIGS. 11 and 12 includes an integral actuator 127 connected with the pivotal connection 114. Two recesses 128 are formed across opposite sides of the actuator 127 at the pivotal connection 114 to allow pivotal movement of the arms 112, 113 relative to the actuator. The actuator 127, then, is movable into a central area 129 between the flexible connectors 115, 116 to drive the pivotal connection 114 out of the area 129 and expand the locking structure 111.

The actuator 127 includes a pair of locking shoulders 130 engageable with shoulders 131 on the connector end portions 122 and 123. Once the actuator 127 is forced past the connector end portions 122, 123, fully into the central area 129, the shoulders 131 and 130 engage and lock the actuator 127 in place with the locking structure 111 fully expanded.

A head covering 132 is connected with the actuator 127 and has recesses 133 and 134 conforming with the head-defining enlarged connector ends 122, 123. When the actuator 127 is depressed, the head covering 132 receives and conceals the connector ends. The head covering 132 conveniently provides an outer, visible portion of the fastener 110 which may be modified as desired to provide an attractive outer appearance.

A fastener modification 135, similar to the fastener 110, is illustrated in FIGS. 13 and 14. It includes a pair of outwardly extensible arms 136 and 137, a central pivotal connection 139, resilient connectors 140 and 141, and an integral actuator 142. Again, the flexible connectors 140, 141 have enlarged end portions 143 and 144, respectively, which are the head of the fastener 135. The connectors extend from the end portions 143, 144 to combined arm and connector terminal portions 145 and 146.

The actuator 142 includes an end surface 147 cooperable with two shoulders 148 defined by the enlarged connector end portions 143 and 144 to lock the actuator 142 centrally between the connectors 140 and 141. A first upper lateral groove 150, at the connection of the arms 136, 137, and a further pair of lateral grooves 151, on opposite sides of the actuator 142, provide the pivotal connection 139 which allows pivotal movement of the arms relative to the actuator. Once the actuator 142 is forced fully upwardly, the pivotal connection 139 moves out of alignment with the forces applied to the arms 136, 137, and the arms are placed in overcenter condition. The locking structure is further secured against collapse by engagement of the actuator surface 147 with the shoulders 148 on the connector ends.

The actuator 142 provides a convenient means for the removal of the fastener 135. Withdrawal of the actuator forces the terminal surface 147 past the shoulders 148 and collapses the locking structure. To this end, the actuator 142 may be threaded as shown at 152 for connection with a withdrawing tool 153.

Being identical in cross section throughout its width, the fastener 135 is particularly suitable for formation by extrusion; in which case, a continuous strip having the same cross-sectional configuration may be produced and severed into separate fasteners. Thus, the versatility of fasteners in accordance with the invention lies not only in the wide range of available uses and configurations, but also in the manner in which the fasteners may be economically produced.

The two fastener arrangements of FIGS. 11 through 14 may, as illustrated, be dimensioned to provide overcenter locking in addition to the locking which results from the engagement of the actuator with the shoulders of the connector ends. Alternatively however, the locking of the integral actuators and enlarged connector ends is sufficient to maintain the fastener locked in position without overcenter movement of the locking structure arms. The material of the fasteners 110 and 135 should, of course, be sufficiently compressible to allow forcing of the actuators past the connector ends, there to hold the locking structure in its expanded condition.

Figure 15:
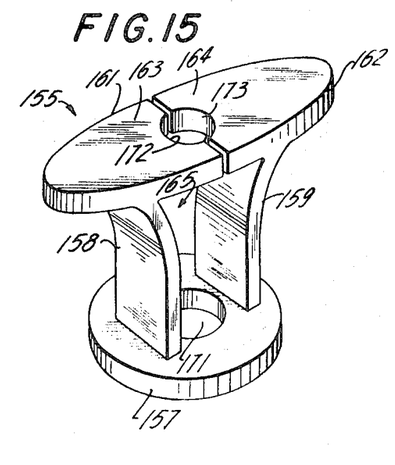
FIG. 15 is a perspective view, the fastener here being particularly adapted for use with a screw or stud.
Figure 16:
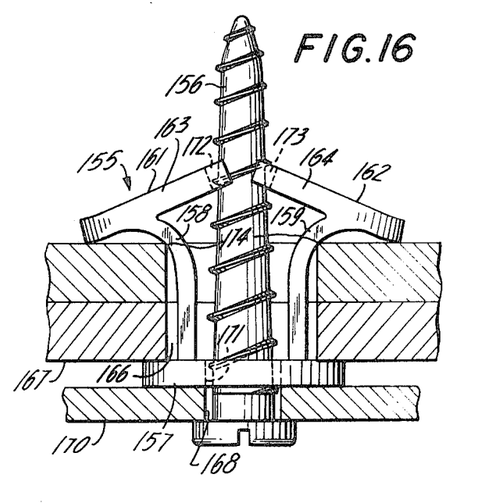
FIG. 16 is a fragmentary view, partially in section, showing the arrangement of FIG. 15 with a screw centrally inserted to cause overcenter movement of extensible arms about the central arm portions.
Figure 17:
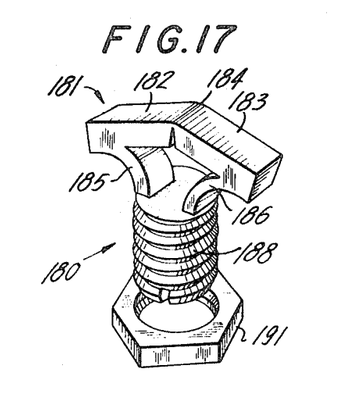
FIG. 17 illustrates, in perspective, the fastener as adapted for expansion of the locking structure or toggle lock without the application of an actuating force to the pivotal arms.
Figure 18:
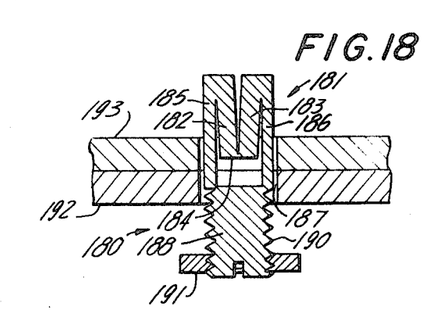
FIG. 18 is a fragmentary sectional view, showing the arms of the fastener of FIG. 17 in collapsed position during insertion.

Turning to FIGS. 15 and 16, a modified fastener 155 is particularly adapted for use with an inserted stud or self-threading screw 156. The fastener 155 includes a head 157, a pair of flexible resilient connectors 158 and 159, and normally outwardly extending arms 161 and 162. The arms 161, 162 include proximate centrally located ends 163 and 164, respectively. These ends are movable into a central open area 165 for insertion of the arms through an opening.

In using the fastener 155, the arms 161, 162 are collapsed inwardly, and the arms and associated connectors are inserted into an opening 166 until the fastener head 157 engages a surface 167 adjacent the opening 166. The screw 156 is inserted through an opening 171 in the head 157. The screw engages the centrally located arm ends 163, 164 at a pair of cooperating recesses 172 and 173. Insertion of the screw 156 through the opening 166 causes the arms 161, 162 to pivot centrally about their points of engagement with the screw, the arms assuming an expanded overcenter position in which the flexible connectors 158, 159 are outwardly resiliently deformed about points of contact 174 at edges of the opening 166. Again, the forces applied to the arms by the flexible connectors are directed laterally inwardly and resist return of the arms to their collapsed positions.

The screw 156 is then turned, the threads thereon bite into the arms 161, 162 at the recesses 172, 173, and the centrally located arm ends 163, 164 are drawn toward the head 157, causing the arms to move toward an aligned position. However, the presence of the screw 156 maintains a separation between the central arm ends 163 and 164 as the arms move further toward oncenter alignment, and the flexible connectors 158, 159 are placed further in tension by the gradual spreading of the arms. Thus, the screw 156 is held securely in threaded engagement with the arms 161 and 162, while itself helping to hold the arms in their expanded overcenter position.

In FIGS. 17 through 20 a further adaption 180 of the fastener provides fastening in the fashion of a threaded bolt. Yet, only one end of an associated opening need be accessible and no opening need by provided through the fastener. A locking structure 181 includes arms 182 and 183 joined centrally at 184 and joined to resilient flexible connectors 185 and 186. The locking structure 181 is formed in the expanded overcenter condition shown in FIG. 17. The arms 182, 183 naturally assume their spread positions, absent the application of external forces.

Figure 19:
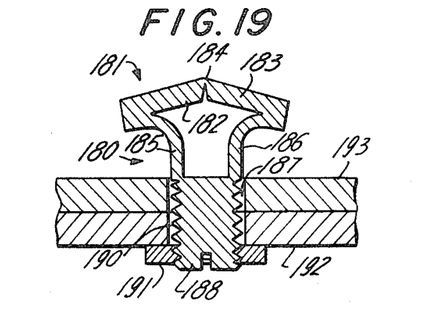
FIG. 19 is a further fragmentary sectional view, showing the fastener of FIG. 17, the arms having assumed their natural expanded condition following insertion.

The arms 182, 183 are manually collapsed then inserted fully through an opening 187 until free to assume their expanded condition. A narrow, shanklike head 188, joined with the connectors 185, 186, is threaded externally at 190. The head 187 is inserted well into the opening 187 to allow expansion of the arms and connectors at the further end of the opening as shown in FIG. 19. A threaded female member or nut 191, threaded onto the head 188, extends over the surface 192 of the associated apertured member. The locking structure 181 is drawn toward the opening 187 by relative rotation of the nut 191 and fastener 180.

Figure 20:
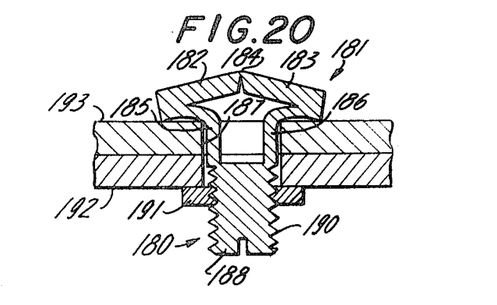
FIG. 20 is another fragmentary sectional view, the connectors and expanded arms of the fastener of FIG. 17 having been drawn into engagement with an apertured member by the partial withdrawal of a threaded head.

Thus, the flexible connectors 185, 186 are drawn into contact with edges of the opening 187 again to apply laterally inwardly directed forces resisting collapse of the arms 182, 183. The fastener, then engages opposite surfaces 192 and 193 of the apertured member or members and is there held fast. Contrary to normal nut and bolt arrangements, there need not be access to areas near each end of the opening.

Figure 21:
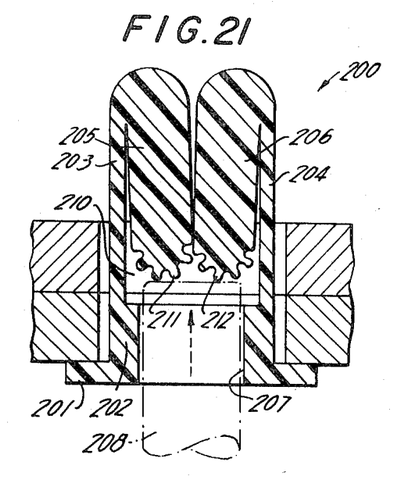
FIG. 21 is a fragmentary sectional view, showing the fastener with arms pivotally connected by mating gear teeth.
Figure 22:
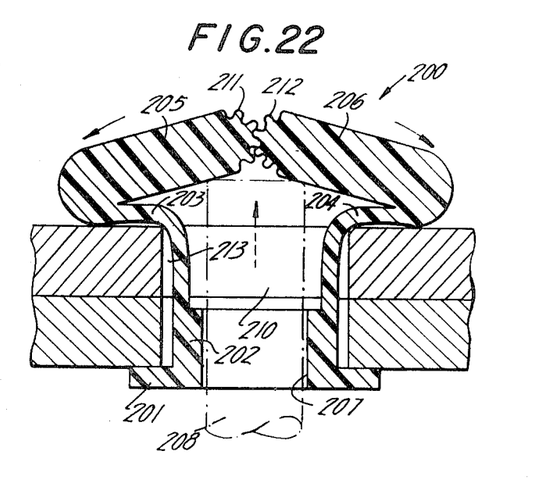
FIG. 22 is a fragmentary sectional view, showing the arms of the fastener of FIG. 21 in overcenter relationship with the gear teeth in mating engagement.

FIGS. 21 through 25 illustrate further variations in the manner of pivotally connecting the arms of fastener locking structures of the type described above. In FIGS. 21 and 22 a fastener 200 has a head 201, a reinforcing boss 202, a pair of flexible connectors 203 and 204, and a pair of centrally pivotally connected arms 205 and 206. The head 201 and the boss 202 have an opening 207 therethrough for the insertion of a tool 208 into a central area 210 for engagement with the central ends of the arms 205, 206.

The centrally located arm ends, however, include integrally formed gear teeth 211, 212 which mesh when forced upwardly by the tool 208 to pivot the arms as in FIG. 22. Again, the fastener 200 engages the members through which it extends at opposite ends of an opening 213, the forces applied to the expanded arms 205, 206 by the connectors 203, 204 preventing collapse of the arms.

Figure 23:
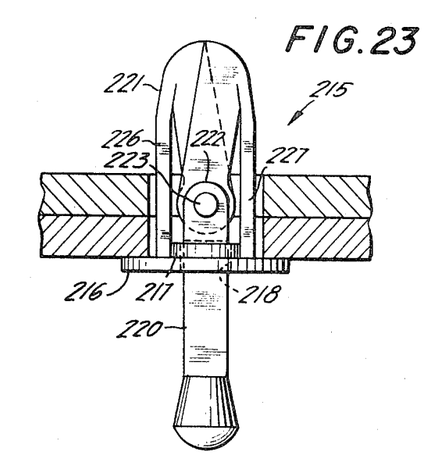
FIG. 23 is a fragmentary view, partially in section, of an easily retractable arrangement of the fastener.
Figure 24:
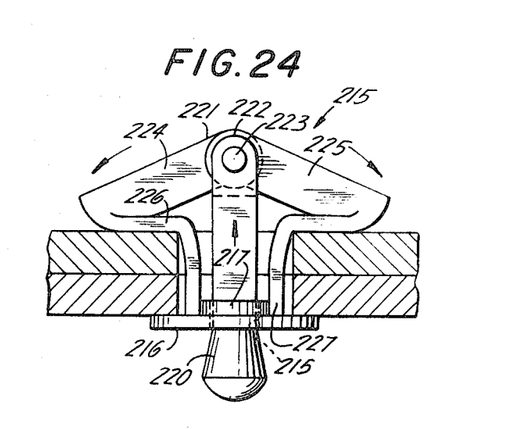
FIG. 24 is a further fragmentary view, partially in section, the fastener of FIG. 23 having expansible arms in expanded overcenter condition as actuated by a centrally located plunger.
Figure 25:
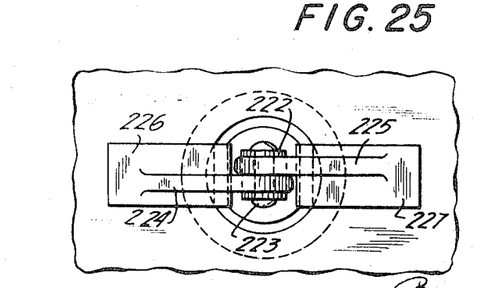
FIG. 25 is a fragmentary elevational view of the fastener of FIG. 23, showing a pivot pin connecting the expansible arms.

In FIGS. 23 through 25, an easily retractable fastener modification 215 has a head 216 and a boss 217 which include an opening 218 through which extends a plunger 220 for actuating a locking structure 221 between expanded and collapsed conditions.

The plunger 220 includes a bifurcated end 222, spanned by a pivot pin 223, pivotally interconnecting a pair of laterally extensible arms 224 and 225. A pair of flexible connectors 226 and 227 interconnect the head 226 and arms 224, 225, acting in the fashion of the connectors previously described. Insertion of the fastener 215 into an opening, and depression of the plunger 220 locks the fastener in place, and withdrawal of the plunger allows easy removal of the fastener.

Figure 26:
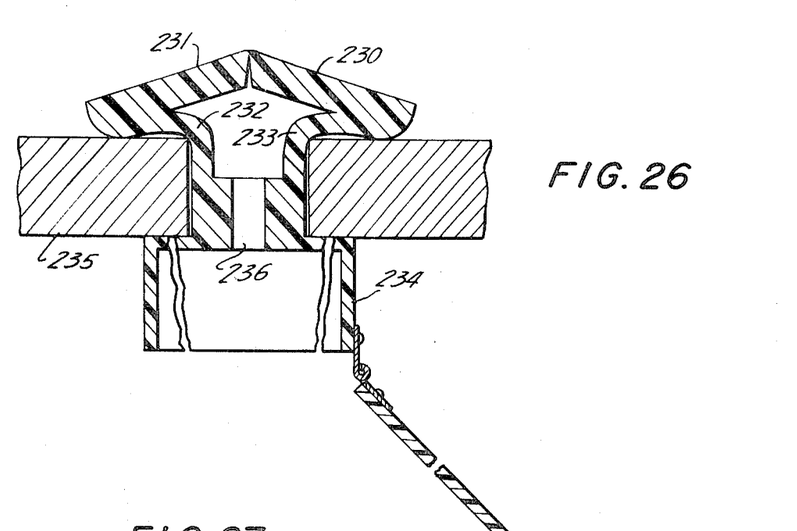
FIG. 26 is a fragmentary sectional view, illustrating the fastener in accordance with the invention formed as an integral part of a supported device.
Figure 27:
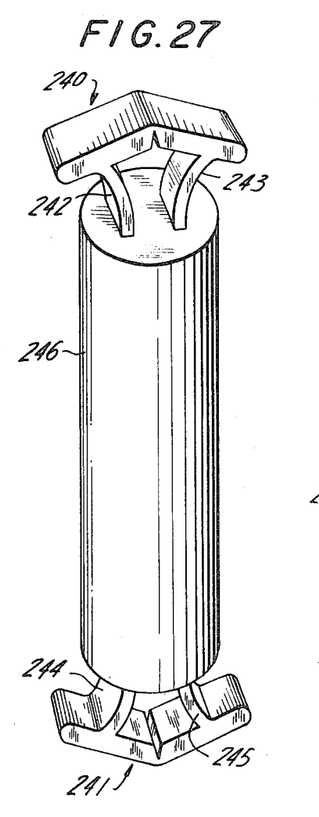
FIG. 27 is a perspective view of fasteners integrally formed at ends of a spacer member to be supported therebetween.
Figure 28:
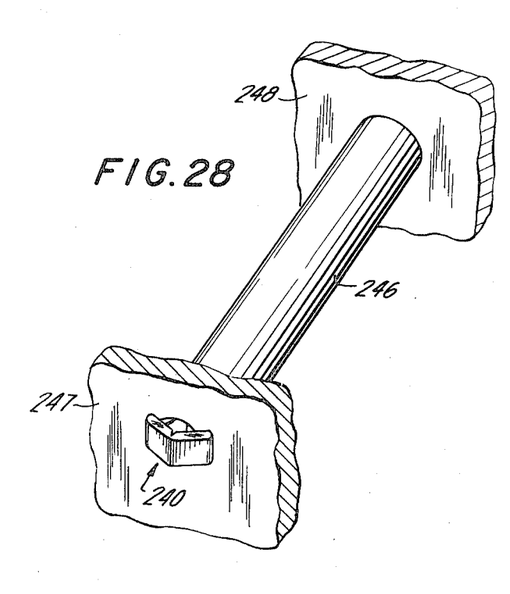
FIG. 28 is a fragmentary perspective view, illustrating the spacer of FIG. 27 locked in place by the integrally formed fasteners.

The many uses of the fastener in accordance with this invention are exemplified by the arrangements shown in FIGS. 26 through 28. In these arrangements, the connectors and centrally pivotally connected arms are shown integrally formed with the members which they support. In FIG. 26, a fastener 230 includes a locking structure 231 connected with flexible connectors 232 and 233. The fastener head is, however, provided by a container 234. The container is supportable upon a wall 235 or other member by actuation of the locking structure 231 through an opening 236 and the container is conveniently employable as an electrical fuse box, a cabinet, or storage area, as desired.

In FIGS. 27 and 28, locking structures 240 and 241 are shown connected, by integral flexible connectors 242 through 245, with a spacer or connecting rod 246. The rod 246 is employable with spaced panels 247 and 248 to be supported between the panels, maintaining the appropriate spacing thereof. The locking structures 240 and 241 are actuated by directly applied forces, rather than through associated openings, causing overcenter snap-action of the locking structures into their expanded condition.

While a number of fastener embodiments have been described, it will be apparent that further embodiments within the scope of the invention may be used in various applications, and the above and other embodiments may be modified with particular regard to their intended use without departure from the scope of the invention embodied therein.

I claim:
1. A plastic fastener for insertion in an opening to be locked therein, the fastener including a head for location at one end of the opening, expansible locking means for location at the other end of the opening, and flexible spaced apart connectors extending between and connected to the head and the expansible means for extension through the opening, the expansible locking means including a pair of toggle members with centrally located, pivotally associated ends movable axially into a collapsed position between the connectors and movable across-center away from the head to an expanded stable overcenter locking position, the toggle members having, at their centrally located ends, an area of substantially reduced thickness forming a pivotal interconnection between the toggle members for pivotal movement of the toggle members between the collapsed and expanded positions and a recess between the centrally located ends when the toggle members are expanded, the connectors being joined to the toggle members at locations on the toggle members spaced sufficiently radially outwardly with the toggle members in the expanded overcenter position to force the flexible members radially outward relatively far from their radial location with the toggle member in their contracted position, whereby upon insertion of the fastener in an opening and expansion of the expansible means the connectors flex about the said other end of the opening well beyond the opening edges, engaging the opening edges, and holding the fastener in place while urging the toggle members against across-center return and collapse.

2. The fastener according to claim 1, wherein the spaced apart connectors include intermediate portions forming means for engaging edges of an opening to tightly resiliently stretch the interconnecting means between the connection thereof with the expanded toggle members and points of contact with the opening edges.

3. The fastener according to claim 1, wherein the toggle members are substantially rigid and the spaced apart connectors are more flexible for extension outwardly about opening edges.

4. The fastener according to claim 1, wherein the head is a substantially nondeformable member which retains its configuration when the toggle members are expanded and the connectors are resiliently deformed outwardly.

5. The fastener according to claim 1, including means for preventing further pivotal movement of the toggle members away from their oncenter position when the extensible portions are in said expanded stable position.

6. The fastener according to claim 5, wherein the further pivotal movement preventing means includes outermost portions of the toggle members extensible outwardly from the connector means upon expansion of the toggle members for engagement with a surface near an opening end.

7. The fastener according to claim 5, wherein the further pivotal movement preventing means includes centrally located sections of the toggle members placed in stressed condition by further pivotal movement of the toggle members away from their oncenter position.

8. The fastener according to claim 1, including an opening through said head in alignment with the central pivotal connection to allow forcing of the pivotal connection away from the head to expand the toggle members.

9. The fastener according to claim 1 for attaching a part to an apertured member, wherein the resilient connectors and toggle members are integrally formed with said part, and said part forms the head of the fastener.

10. The fastener according to claim 1, wherein the toggle members normally automatically assume the expanded, stable, overcenter condition and are manually collapsible for insertion through an opening, and the connectors comprise means for applying said inwardly directed forces to the expanded toggle members to resist collapse from the normal expanded condition.

11. The fastener according to claim 10, wherein the head comprises means for extension into an opening to allow return of the toggle members to their normal expanded condition adjacent the further end of the opening, and further including means for withdrawing the head to draw the expanded toggle members toward the further end of the opening.

12. The fastener according to claim 1, wherein the centrally located ends define means engageable by an inserted member for forcing the arms into the overcenter position.

13. The fastener according to claim 1 for use with an opening in a relatively thin member, the head defining an opening therethrough, and said toggle members extending longitudinally through said head opening when the locking means is collapsed.

14. The fastener according to claim 1, for use with an inserted threaded member, wherein the fastener is made of material capable of self-threading engagement by the threaded member to anchor the threaded member.

15. The fastener according to claim 1, wherein the toggle members are joined with an associated connector at a junction, the junction, toggle members, and connectors are all collapsible to within a predetermined transverse dimension, and the junctions are located on the toggle members for movement outwardly sufficiently beyond said transverse dimension to define means for engaging edges of a hole of said dimension and to define means for applying inward forces between edges of a hole of such dimension and the toggle members to prevent removal of the fastener and return across-center collapse of the toggle members by the application of forces through the connectors to the toggle members.

16. The fastener according to claim 15 wherein, in the expanded condition, the fastener is free of any direct axial connection through the connectors from said head to the toggle members capable of applying axial forces therealong tending to collapse the toggle members by return, across-center movement.

17. The fastener according to claim 1, wherein the flexible interconnection of the toggle members joins the toggle members together near the surfaces thereof farthest from the fastener head when the toggle members are in their expanded condition, the flexible interconnection and adjacent toggle member ends forming said recess aligned with the head on the same side of the flexible interconnection as the head.

18. A plastic fastener for insertion in an opening and including a head, expansible toggle members, and connectors, each connector extending from the head to a toggle member, the connectors being flexible, spaced apart, and free of restraining interconnection in the sections of the connectors intermediate the head and the toggle members, the connectors having outer surfaces engageable with an edge of the opening and extensible radially outwardly away from the opening, the toggle members being less easily flexed than the flexible connectors and having distinct central ends, in the expanded condition the toggle member ends having a recess therebetween at a central location, the central toggle member ends being in freely pivotal relation permitting substantially free pivoting of the toggle members about said central location from a collapsed, side-by-side condition, through an aligned condition, to an overcenter, expanded condition in which the toggle members are substantially undeformed, the toggle members in said expanded condition driving the connectors radially outwardly a substantial distance beyond the radial spacing thereof with the toggle members in the collapsed condition to drive the connectors into engagement with opening edges and substantially beyond the opening edges, the connectors when placed in tension between opening edges and their connection with the toggle members, defining means for applying forces to the toggle members toward the opening edges resisting return across-center collapse of the toggle members to make said overcenter condition of the toggle members a stable, self-sustained condition absent any additional member between the head and the toggle members.

19. The fastener according to claim 18, wherein said connectors are connected to the toggle members in angular relation thereto at integrally formed points of angular connection.

20. The fastener according to claim 19, wherein the fastener is of molded one-piece construction.

21. A self-opening plastic fastener including a head, toggle members, and spaced connectors, the spaced connectors being integrally molded with the toggle members in a natural, expanded, unbiased, overcenter position, and said connectors diverging from a closely spaced relationship at the connection thereof with the head, to a substantially greater radial spacing at the connection thereof with the toggle members, the toggle members being collapsible by across-center movement of the centrally located ends thereof, forcing the toggle members and connectors to a substantially axially extending disposition of reduced radial extent, and the toggle members and connectors being naturally biased to the expanded overcenter position when in said contracted condition to define an automatically expansible snap opening locking means.

22. The fastener according to claim 21 wherein, in the expanded overcenter position of the toggle members, said connectors are joined with the toggle members at locations on the toggle members spaced sufficiently radially outwardly to force the flexible members radially outward relatively far from their radial location with the toggle members in their contracted condition, whereby upon insertion of the fastener in an opening and expansion of the expansible means, the connectors flex about the opening end nearest the toggle members, beyond the edges of the opening, engaging the edges of the opening, and holding the fastener in place while urging the toggle members against across-center return and collapse.

23. The fastener according to claim 21, wherein said head is narrow for insertion into an opening to permit movement of the toggle members across-center to the stable expanded condition and retraction of the head to cause engagement of the spread-apart connectors with hole edges.

24. The fastener according to claim 21, for supporting a part in an apertured member, wherein said head of the fastener comprises the part to be supported.

25. The fastener according to claim 21, wherein the toggle members are relatively long and, when in collapsed generally longitudinally extending condition, extend into an opening in the head.

26. The fastener according to claim 21 for employment with an opening formed in a member, wherein the connectors define force applying means for extending into engagement with edges of the opening to transmit said inwardly directed forces to the expanded locking means.

27. The fastener according to claim 21, wherein the toggle members have a pivotal connection at the centrally located ends thereof, and the pivotal connection is normally disposed out of alignment with the connections of the toggle members and the connectors, and is movable further out of alignment away from the head upon application of said inwardly directed forces by the connectors.

28. The fastener according to claim 27, wherein the connectors define means for transmitting the laterally inwardly directed forces to the toggle members by engagement of the spaced connectors with edges of an opening.

* * * * *